April 10, 1973 TAKEO NISHIKAWA 3,726,737
METHOD OF PRODUCING SILICON CARBIDE ARTICLES HAVING
THIN LAYER CONSTRUCTION
Filed Oct. 22, 1970

INVENTOR,
TAKEO NISHIKAWA
BY Holman & Stern
ATTORNEYS

United States Patent Office 3,726,737
Patented Apr. 10, 1973

3,726,737
METHOD OF PRODUCING SILICON CARBIDE ARTICLES HAVING THIN LAYER CONSTRUCTION
Takeo Nishikawa, Chigasaki, Japan, assignor to Nippon Oil Seal Industry Co., Ltd., Fujisawa, Kanagawa, Japan
Filed Oct. 22, 1970, Ser. No. 83,037
Int. Cl. D21f 11/12; B31f 1/20; C01b 31/36
U.S. Cl. 156—210                                      8 Claims

ABSTRACT OF THE DISCLOSURE

Production of articles of silicon carbide having multiple thin layer construction by forming a multiple layer construction of cellulosic sheets such as paper, carbonizing the construction in a non-oxidizing atmosphere, and silicon-carbonizing the resultant article. Some or all of the sheets may be shaped such as by corrugating and the sheets may be resin-impregnated and adhesively treated prior to formation of the initial multiple layer construction to provide a firmer product.

---

This invention relates to the production of articles of silicon carbide having multiple thin layer construction and relates more particularly to techniques for producing such articles from multiple thin layer constructions formed of cellulosic material.

Silicon carbide is a well known material having excellent hardness, strength, good thermal conductivity at high temperatures and good electrical properties. Silicon carbide articles are commonly used wherever hard materials are desired such as in cutting tools and the like. Further, articles formed of silicon carbide are frequently used as refractories, and as non-metallic resistances, such as in heating elements and the like. Many uses for silicon carbide require a shaped construction, but particularly due to its great hardness, silicon carbide is difficult to shape. Moreover, in many ways silicon carbide is a fragile material.

In conventional techniques of producing a shaped silicon carbide article silicic anhydride carbon, silicon carbide, etc. is mixed with coal tar pitch or a resin binder and after the mixture is shaped by extruding or molding into rods, pipes, blocks, etc. it is heated in a non-oxidizing atmosphere to produce the shaped silicon carbide. While this procedure results in the production of a shaped silicon carbide, some silicon or silicic anhydride used as the starting material remains in the product. Further, the chemical reactions in the entire system cause a great dimensional change making it almost impossible to produce a shaped silicon carbide article corresponding to the dimensions of the initial material. For this reason, it is quite difficult using prior art techniques to produce shaped silicon carbide articles and, particular difficulties are realized in attempts to fabricate a multiple thin layer construction of silicon carbide using such prior art processes.

A basic object of the instant invention is to provide a method for the production of shaped silicon carbide articles overcoming the foregoing and other such disadvantages. More specifically, it is a primary object of this invention to provide a technique for the production of multiple thin layer constructions of silicon carbide which is highly efficient and which is capable of producing shaped silicon carbide articles of consistent and reproducible dimensions.

A further object of this invention is to produce multiple thin layer constructions of silicon carbide from relatively inexpensive starting materials such as ordinary sheets of paper. Moreover, it is an important object of this invention to provide for the production of silicon carbide articles of highly complex shapes in a relatively simple and reproducible manner.

Particular features of this invention provide for the production of shaped silicon carbide articles of multi-thin layer construction which are strengthened by impregnation with a resin and/or adhesive material which forms part of the final article after treatment.

Other and further objects will be recognized by reference to the following detailed specification and the accompanying drawing wherein.

Like reference characters refer to like parts throughout the several views of the drawing.

Figure 1:
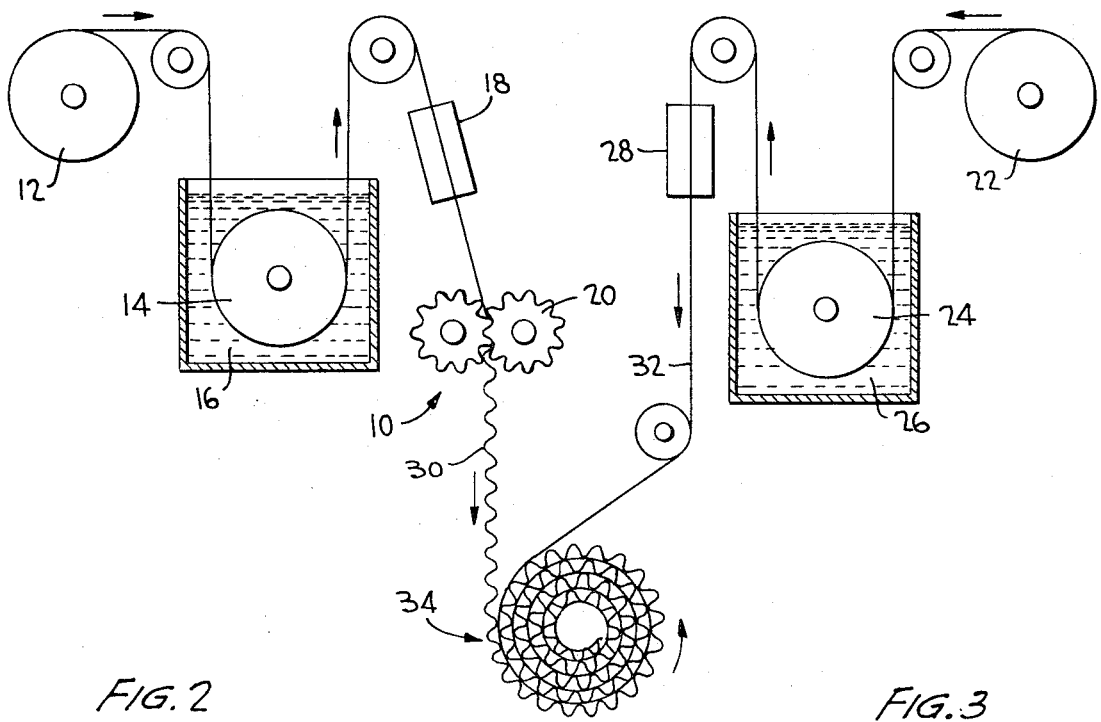
FIG. 1 is a schematic showing of one technique for forming an intermediate multiple thin layer construction of cellulosic material to be subsequently processed into a shaped article of silicon carbide.

The basic concepts of the instant invention comprises initially forming a multiple thin layer construction from a cellulosic material such as sheets of paper, carbonizing the same to produce a carbide of the same shape and then silicon-carbonizing the shaped carbide to produce a final product corresponding to the shape of the initial multiple thin layer construction. Preferably, as will be pointed out in more detail hereinafter, the cellulosic material is resin-treated to strengthen the final product.

Thus, the first step of the method of the instant invention comprises the formation of a multiple thin layer construction of cellulose sheets and the resin treatment thereof. The multiple thin layer construction may be formed of sheets of paper or the like of any desired shape, and preferably has a wave-like form. The most desirable material to utilize for the basic starting material is a material which can be carbonized without evaporating or melting to produce a shaped carbon product of basically the same configuration as the starting material. An excellent example of such material is ordinary paper sheets.

The multiple thin layer construction may be shaped in any manner such as by forming the sheets into a wave-like configuration and combining these shaped sheets with other sheets to produce the intermediate cellulosic product. Some or all of the starting material may be resin-treated as will be explained further hereinafter and the sheets may be combined with starch or other adhesive being applied to one side. The assembly of sheets is preferably coiled into a roll for subsequent treatment.

The resin-treatment, that is, impregnation of the sheets with resin, provides for a firmer construction. To improve the ability to impregnate the sheets, porous cellulosic sheets, such as paper are particularly useful. The resin treatment enables the regular production of constructions of a highly complicated shape.

The treating agents that are used are preferably those which have a high carbonization rate, much of the material remaining after carbonization, thereby increasing the firmness of the shaped carbon material. For this purpose, materials such as phenol formaldehyde, epoxy, indene coumarone resins, coal tar pitch and the like may be used. The starches or adhesives should have the same carbonization rate as the resinous substances and those which would evaporate during heating should not be employed. Specifically, phenol formaldehyde, epoxy and so on may be used for resin-pretreated sheets and starch, gum arabic may be used for sheets which have not been resin-pretreated.

Following the formation of the multiple thin layer construction of cellulosic material, this intermediate product is carbonized in a conventional manner in a non-oxidizing atmosphere to provide a shaped carbide of the same shape as the cellulosic construction. The non-oxidizing atmosphere may, for example, be argon, helium, nitrogen, hydrogen, or the like. Preferably, the carbonizing temperature is from about 600° C. to 900° C. Under these conditions the cellulosic sheets are converted into cellulosic carbon, maintaining their general shape and the resinous substances, the starch, the adhesive, etc. are similarly carbonized to produce resin-carbon which serves to reinforce the shaped carbon product.

The final step in the process of the instant invention comprises the silicon-carbonization of the shaped carbon according to conventional techniques. This silicon-carbonization may be carried out with the use of silicon monoxide, silicon dioxide, silicon, etc. according to any of the following equations:

$$2C + SiO \rightarrow SiC + CO$$

$$3C + SiO_2 \rightarrow SiC + 2CO$$

$$C + Si \rightarrow SiC$$

During the silicon-carbonization the original shape of the construction is generally maintained.

Of the foregoing reactions, the one using silicon monoxide is preferred. Generally, this reaction is carried out at a temperature of from about 1700° C. to about 2200° C., most preferably from 1900° C. to 1950° C. With lower temperatures there is a tendency for the bonding of the resultant silicon carbide product to be poor or the reaction speed to be slow and at higher temperatures the produced silicon carbide article has a tendency to be decomposed into carbon and silicon.

The product obtained by utilizing the process of the instant invention is a multiple thin layer construction of silicon carbide which maintains all the properties of ordinary silicon carbide such as good hardness, electrical conductivity, thermal conductivity, low thermal expansion rate, good heat resistance, good chemical resistance, etc. Such materials may be used for example, for producing honey comb matrices for gas turbine rotary heat regenerators or the like.

Reference will now be made to the drawing for an illustrative showing of the process steps, the apparatus and the resultant products. In FIG. 1 an exemplary schematic diagram for the first step of the instant invention is shown illustratively at 10. As seen from this figure a first roll of paper 12 is passed over an idler 14 in a bath 16 of a resinous treating material in liquid form and then dried as indicated schematically at 18. The dried resin-treated sheet material is corrugated by passing the same between intermeshed gears 20.

An additional roll of paper 22 is continuously passed over an idler 24 through a further bath of resinous material in liquid form 26 and dried at 28. The resin-treated corrugated sheet 30 and the resin-treated flat sheet 32 are then superimposed and coiled to form a roll 34 in the form of a multiple thin layer construction of cellulose sheets. This roll 34 can be severed at any point to form an intermediate product for subsequent processing.

Figure 2:
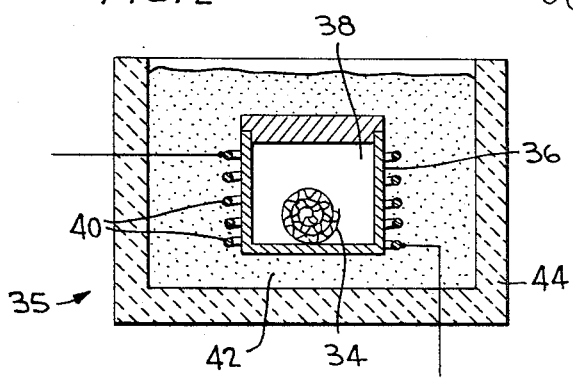
FIG. 2 is a schematic cross-sectional view through a carbonizing furnace to be used in treatment of the product resulting from the process shown in FIG. 1.

The intermediate product is then carbonized as shown generally at 35 in FIG. 2 by placing the product in a closed reactor 36 containing a non-oxidizing atmosphere 38. The reactor 36 may be heated in any conventional manner such as by the heating wires 40 contained in lagging material 42 within a brick wall 44.

Figure 3:
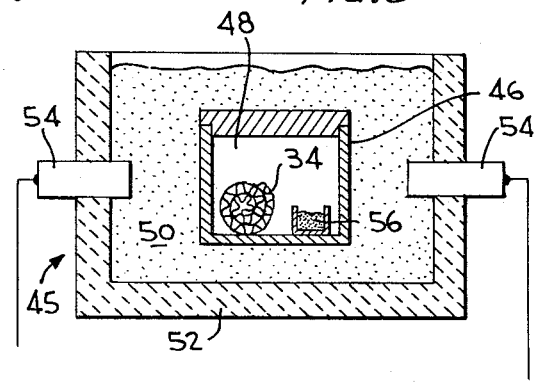
FIG. 3 is a view similar to FIG. 2 of a silicon-carbonizing furnace which may be used to treat the carbonized product resulting from heat treatment in the furnace of FIG. 2.

Following carbonization as shown in FIG. 2, the carbonized multiple thin layer construction can then be silicon-carbonized as shown in FIG. 3 at 45. Again, the carbonized product resulting from the treatment of FIG. 2 is placed within a closed reactor 46 containing a non-oxidizing atmosphere 48. The furnace shown in FIG. 3 includes a packing 50 of carbon contained within a brick wall 52 including electrode heating means shown schematically at 54. A source of silicon monoxide gas is illustratively shown at 56 within the reactor 46. Various materials which will produce silicon monoxide gas are well known.

Figure 5:
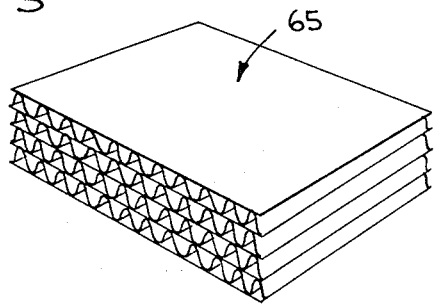
FIG. 5 is a view similar to FIG. 4 of an alternate product.
Figure 4:
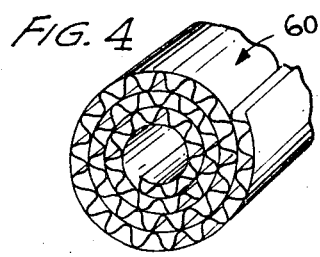
FIG. 4 is a fragmentary perspective view of one form of silicon carbide article having a multiple thin layer construction according to the instant invention.

One form of product resulting from the instant inventive concepts is illustratively shown at 60 in FIG. 4 as a coiled multiple thin layer construction. Alternatively, a flat construction such as shown at 65 in FIG. 5 can be produced in an obvious manner.

While one form of apparatus which can be used with the techniques of this invention has been illustratively shown, it is obvious that various modifications of the apparatus can take place without departing from the instant inventive concepts. Also, while a continuous process has been illustrated, it is not necessary that the instant inventive concepts be carried out in a continuous manner and, even as shown, the coil 34 of multiple thin layer cellulosic material can be stored for subsequent carbonizing and silicon-carbonizing. Additionally, although superimposed layers of corrugated and uncorrugated cellulosic sheets have been illustrated, various other multiple thin layer constructions can obviously be produced according to the instant invention, depending upon the desired end use.

The following non-limiting examples are set forth to further illustrate the instant inventive concepts:

EXAMPLE 1

Corrugated paper envelopes and other paper envelopes having gum arabic applied on one side were rolled to form a honey comb multiple thin layer construction. This construction was dried at 50° C. for ten hours and impregnated with a liquid phenol-formaldehyde resin (80% phenol-formaldehyde, 20% methanol) of one poise. Following impregnation of the resin, the construction was carbonized in a non-oxidizing atmosphere with a temperature increase of 30° C. per hour up to 800° C. and cooled thereafter. The resultant shaped carbon was reacted with a gaseous silicon monoxide at 1900° C. for two hours, the quantitative ratio of carbon to silicon monoxide being about 1 to 2 by weight. The resultant product was a multiple thin layer construction of silicon carbide of the same basic shape as the original multiple thin layer construction of paper envelopes.

EXAMPLE 2

Paper envelopes were dipped in a 50% methanol solution of Bakelite (phenol-formaldehyde resin) and slightly dried at 80° C. The dried paper envelopes were corrugated and rolled together with other paper envelopes having an adhesive coating of Bakelite applied on one side to form a honeycomb. This construction was carbonized and silicon-carbonized as in Example 1 to produce a multiple thin layer construction of silicon carbide.

What is claimed is:
1. A method of producing articles of silicon carbide having a multiple thin layer construction comprising forming a multiple thin layer construction of cellulosic material, impregnating said cellulosic material with a resionus material, carbonizing said construction in a non-oxidizing atmosphere, and silicon-carbonizing the resultant carbon construction in the presence of a gas selected from the group consisting of silicon monoxide, silicon dioxide, silicon and mixtures thereof at a temperature of about 1700 to about 2200° C. to produce an article of silicon carbide substantially conforming in shape to the initial shape of the multiple thin layer construction of cellulosic material.

2. The method of claim 1 wherein said construction is carbonized by heating same at a temperature of from about 600 to 990° C. in an atmosphere selected from the group consisting of argon, helium, nitrogen and hydrogen.

3. The method of claim 1 wherein said cellulosic material comprises sheets of paper.

4. The method of claim 2 wherein said multiple thin layer construction of cellulosic material is formed by corrugating at least one sheet of paper and superimposing a plurality of layers of sheets of paper.

5. The method of claim 3 wherein alternate sheets of corrugated and uncorrugated paper are superimposed.

6. The method of claim 4 wherein a sheet of corrugated paper and a sheet of uncorrugated paper are superimposed and the resultant combination is coiled to form a roll of multiple thin layer construction.

7. The method of claim 4 wherein at least one side of alternate sheets of paper is treated with an adhesive material.

8. The method of claim 4 wherein said sheets of paper are impregnated with a resinous material selected from the group consisting of phenol-formaldehyde, epoxy, indene-coumarone resins and coal tar pitch, said impregnated sheets are dried, one of said impregnated sheets is corrugated, said corrugated and uncorrugated sheets are superimposed and the resultant combination is coiled to form a roll of multiple thin layer construction.

References Cited
UNITED STATES PATENTS

| | | | |
|---|---|---|---|
| 3,269,802 | 8/1966 | Wainer et al. | 23—208 A |
| 3,518,142 | 6/1970 | Dooley | 156—327 X |
| 2,805,972 | 9/1957 | Cross et al. | 156—337 X |
| 3,519,472 | 7/1970 | Dyne et al. | 23—208 A |
| 2,609,318 | 9/1952 | Swentzel | 161—182 |
| 3,198,714 | 8/1965 | Johnson et al. | 23—209.2 X |
| 3,271,109 | 9/1966 | Mezey et al. | 23—208 A |
| 3,275,488 | 9/1966 | Bailey et al. | 156—337 X |
| 3,485,591 | 12/1969 | Evans et al. | 23—208 A |
| 3,495,939 | 2/1970 | Forrest | 23—208 A |
| 3,573,086 | 3/1971 | Lambdin | 161—182 X |
| 3,479,151 | 11/1969 | Gutzeit | 423—447 |
| 3,576,700 | 4/1971 | Dell | 156—337 X |
| 3,607,541 | 9/1971 | Tombrel | 156—327 X |

HAROLD ANSHER, Primary Examiner

U.S. Cl. X.R.

156—327, 330, 337; 423—346, 447, 449, 460